(12) United States Patent
Wang et al.

(10) Patent No.: US 11,449,500 B2
(45) Date of Patent: Sep. 20, 2022

(54) METHOD AND APPARATUS FOR OUTPUTTING STRUCTURED QUERY SENTENCE

(71) Applicant: BEIJING BAIDU NETCOM SCIENCE AND TECHNOLOGY CO., LTD., Beijing (CN)

(72) Inventors: Lijie Wang, Beijing (CN); Bo Yu, Beijing (CN); Ke Sun, Beijing (CN); Tingting Li, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 104 days.

(21) Appl. No.: 16/892,874

(22) Filed: Jun. 4, 2020

(65) Prior Publication Data

US 2021/0200763 A1 Jul. 1, 2021

(30) Foreign Application Priority Data

Dec. 31, 2019 (CN) .......................... 201911413464.4

(51) Int. Cl.
*G06F 16/00* (2019.01)
*G06F 16/2452* (2019.01)
(Continued)

(52) U.S. Cl.
CPC ...... *G06F 16/24522* (2019.01); *G06F 16/243* (2019.01); *G06F 16/288* (2019.01); *G06K 9/6224* (2013.01); *G06K 9/6257* (2013.01)

(58) Field of Classification Search
CPC ............ G06F 16/24522; G06F 16/243; G06F 16/288; G06F 16/2433; G06K 9/6224; G06K 9/6257
See application file for complete search history.

(56) References Cited

U.S. PATENT DOCUMENTS

2009/0064053 A1* 3/2009 Crawford .............. G06T 11/206
715/854
2018/0336198 A1 11/2018 Socher
(Continued)

FOREIGN PATENT DOCUMENTS

CN 104657439 A 5/2015
CN 107451153 A 12/2017
(Continued)

OTHER PUBLICATIONS

Anonymous, SEQ2SQL: Generating Structured Queries from Natural Language using Reinforcement Learning, ICLR 2018.
(Continued)

*Primary Examiner* — Ashish Thomas
*Assistant Examiner* — Suman Rajaputra
(74) *Attorney, Agent, or Firm* — Knobbe Martens Olson & Bear LLP

(57) ABSTRACT

Embodiments of the present disclosure provide a method and apparatus for outputting a structured query sentence. The method may include: acquiring a to-be-converted natural language sentence; inputting the to-be-converted natural language sentence into a pre-trained sequence to sequence model to obtain an action sequence corresponding to the to-be-converted natural language sentence; generating a directed acyclic graph according to the action sequence; and outputting a structured query sentence corresponding to the generated directed acyclic graph according to a preset corresponding relationship between a directed acyclic graph and a structured query sentence.

12 Claims, 4 Drawing Sheets

(51) Int. Cl.
*G06F 16/242* (2019.01)
*G06F 16/28* (2019.01)
*G06K 9/62* (2022.01)

(56) References Cited

U.S. PATENT DOCUMENTS

2018/0349377 A1    12/2018  Verma
2020/0301925 A1*   9/2020   Zhong .................. G06N 3/0454
2020/0334233 A1*   10/2020  Lee ....................... G06F 16/243

FOREIGN PATENT DOCUMENTS

| CN | 108319585 | | 7/2018 | |
|----|-----------|---|--------|---|
| CN | 109271496 | | 1/2019 | |
| CN | 109635253 | | 4/2019 | |
| CN | 109684501 | | 4/2019 | |
| CN | 109766355 | | 5/2019 | |
| CN | 110377902 | | 10/2019 | |
| CN | 107451153 B | * | 3/2020 | ....... G06F 16/24522 |
| WO | WO 2018/213530 | | 11/2018 | |

OTHER PUBLICATIONS

Cao J C, et al. Research on technology of generating multi-table SQL query statement by natural language[J]. Journal of Frontiers of Computer Science and Technology, 2020, 14(7): 1133-1141.

* cited by examiner

METHOD AND APPARATUS FOR OUTPUTTING STRUCTURED QUERY SENTENCE

CROSS-REFERENCE TO RELATED APPLICATIONS

This application claims priority to Chinese Patent Application No. 201911413464.4, filed on Dec. 31, 2019, titled "Method and apparatus for outputting structured query sentence," which is hereby incorporated by reference in its entirety.

TECHNICAL FIELD

Embodiments of the present disclosure relate to the field of computer technology, and specifically to a method and apparatus for outputting a structured query sentence.

BACKGROUND

In the information age, a database, as a carrier of information, has been applied more and more widely. There is a need to query various data from the database and master a standard structured query language (SQL). However, for many non-professionals, it is difficult to master the SQL, and it is necessary to learn various syntaxes of the SQL. Therefore, a method of converting a natural language into a structured query sentence is urgently needed for the non-professionals to use the database.

An existing method of generating a structured query sentence is generally to manually write the structured query sentence, or directly input a natural language query sentence into a pre-trained machine learning model to obtain the structured query sentence.

SUMMARY

Embodiments of the present disclosure provide a method and apparatus for outputting a structured query sentence.

In a first aspect, some embodiments of the present disclosure provide a method for outputting a structured query sentence, including: acquiring a to-be-converted natural language sentence; inputting the to-be-converted natural language sentence into a pre-trained sequence to sequence model to obtain an action sequence corresponding to the to-be-converted natural language sentence; generating a directed acyclic graph according to the action sequence; and outputting a structured query sentence corresponding to the generated directed acyclic graph according to a preset corresponding relationship between the directed acyclic graph and the structured query sentence.

In some embodiments, the sequence to sequence model includes a model trained and obtained by: acquiring a sample set, the sample set including a sample natural language sentence and a sample structured query sentence corresponding to the sample natural language sentence; ascertaining a sample directed acyclic graph corresponding to the sample structured query sentence in the sample set according to the preset corresponding relationship between the directed acyclic graph and the structured query sentence; acquiring a sample action sequence of the ascertained sample directed acyclic graph; and using respectively the sample natural language sentence and a sample action sequence corresponding to the sample natural language sentence as an input and an output to train and obtain the sequence to sequence model.

In some embodiments, the generating a directed acyclic graph according to the action sequence includes: generating, based on a shift-reduce algorithm, the directed acyclic graph according to the action sequence.

In some embodiments, the directed acyclic graph includes at least one combination of information items, and the combination of the information items includes parent node information, child node information and relationship information.

In some embodiments, the outputting a structured query sentence corresponding to the generated directed acyclic graph according to a preset corresponding relationship between a directed acyclic graph and a structured query sentence includes: ascertaining a node in the directed acyclic graph as a first part of the structured query sentence, the first part including an aggregator, a field name, a table name and an attribute; and ascertaining a relationship between nodes in the directed acyclic graph as a second part of the structured query sentence.

In a second aspect, some embodiments of the present disclosure provide an apparatus for outputting a structured query sentence, including: an acquiring unit, configured to acquire a to-be-converted natural language sentence; an inputting unit, configured to input the to-be-converted natural language sentence into a pre-trained sequence to sequence model to obtain an action sequence corresponding to the to-be-converted natural language sentence; a generating unit, configured to generate a directed acyclic graph according to the action sequence; and an outputting unit, configured to output a structured query sentence corresponding to the generated directed acyclic graph according to a preset corresponding relationship between the directed acyclic graph and the structured query sentence.

In some embodiments, the apparatus further includes: a training unit, where the training unit includes: a first acquiring subunit, configured to acquire a sample set, the sample set including a sample natural language sentence and a sample structured query sentence corresponding to the sample natural language sentence; a first ascertaining subunit, configured to ascertain a sample directed acyclic graph corresponding to the sample structured query sentence in the sample set according to the preset corresponding relationship between the directed acyclic graph and the structured query sentence; a second acquiring subunit, configured to acquire a sample action sequence of the ascertained sample directed acyclic graph; and a training subunit, configured to use respectively the sample natural language sentence and a sample action sequence corresponding to the sample natural language sentence as an input and an output to train and obtain the sequence to sequence model.

In some embodiments, the generating unit is further configured to: generate, based on a shift-reduce algorithm, the directed acyclic graph according to the action sequence.

In some embodiments, the directed acyclic graph includes at least one combination of information items, and the combination of the information items includes parent node information, child node information and relationship information.

In some embodiments, the outputting unit includes: a second ascertaining subunit, configured to ascertain a node in the directed acyclic graph as a first part of the structured query sentence, the first part including an aggregator, a field name, a table name and an attribute; and a third ascertaining subunit, configured to ascertain a relationship between nodes in the directed acyclic graph as a second part of the structured query sentence.

In a third aspect, some embodiments of the present disclosure provide a device, including: one or more processors; and a storage apparatus, configured to store one or more programs, where the one or more programs, when executed by the one or more processors, cause the one or more processors to implement the method according to the first aspect.

In a fourth aspect, some embodiments of the present disclosure provide a computer readable medium, storing a computer program, where the program, when executed by a processor, implements the method according to the first aspect.

According to the method and apparatus for outputting a structured query sentence provided in certain embodiments of the present disclosure, the to-be-converted natural language sentence is acquired. The to-be-converted natural language sentence is inputted into the pre-trained sequence to sequence model to obtain the action sequence corresponding to the to-be-converted natural language sentence. The directed acyclic graph is generated according to the action sequence. The structured query sentence corresponding to the generated directed acyclic graph is outputted according to the preset corresponding relationship between the directed acyclic graph and the structured query sentence. Thus, the accuracy of outputting the structured query sentence is improved.

BRIEF DESCRIPTION OF THE DRAWINGS

After reading detailed descriptions for non-limiting embodiments given with reference to the following accompanying drawings, other features, objectives and advantages of the present disclosure will be more apparent.

DETAILED DESCRIPTION OF EMBODIMENTS

The present disclosure is further described below in detail by combining accompanying drawings and embodiments. It may be appreciated that the specific embodiments described herein are merely used for explaining the relevant invention, rather than limiting the invention. In addition, it should be noted that, for ease of description, only parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
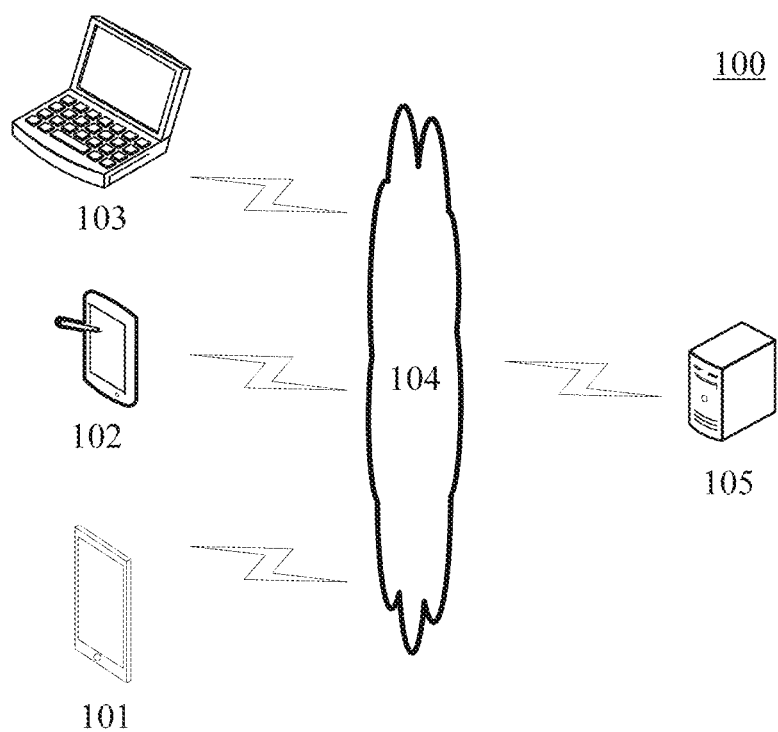
FIG. 1 is a diagram of an example system architecture in which some embodiments of the present disclosure may be applied.

FIG. 1 illustrates an example system architecture 100 in which a method for outputting a structured query sentence or an apparatus for outputting a structured query sentence according to embodiments of the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may interact with the server 105 via the network 104 by using the terminal devices 101, 102 and 103, to receive or send a message, etc. Various client applications (e.g., a database application, a language processing application, an e-commerce application and a search application) may be installed on the terminal devices 101, 102 and 103.

The terminal devices 101, 102 and 103 may be hardware or software. When he terminal devices 101, 102 and 103 are the hardware, the terminal devices 101, 102 and 103 may be various electronic devices having a display screen, the electronic devices including, but not limited to, a smart phone, a tablet computer, a laptop portable computer, a desktop computer, etc. When he terminal devices 101, 102 and 103 are the software, the terminal devices 101, 102 and 103 may be installed in the above listed electronic devices. The terminal devices may be implemented as a plurality of pieces of software or a plurality of software modules, or may be implemented as a single piece of software or a single software module, which will not be specifically defined here.

The server 105 may be a server providing various services, for example, a backend server providing support for the applications installed on the terminal devices 101, 102 and 103. The server 105 may acquire a to-be-converted natural language sentence; input the to-be-converted natural language sentence into a pre-trained sequence to sequence model to obtain an action sequence corresponding to the to-be-converted natural language sentence; generate a directed acyclic graph according to the action sequence; and output a structured query sentence corresponding to the generated directed acyclic graph according to a preset corresponding relationship between the directed acyclic graph and the structured query sentence.

It should be noted that the method for outputting a structured query sentence provided in the embodiments of the present disclosure may be performed by the server 105, or performed by the terminal devices 101, 102 and 103. Correspondingly, the apparatus for outputting a structured query sentence may be provided in the server 105, or provided in the terminal devices 101, 102 and 103.

It should be noted that the server may be hardware or software. When the server is the hardware, the server may be implemented as a distributed server cluster composed of a plurality of servers, or may be implemented as a single server. When the server is the software, the server may be implemented as a plurality of pieces of software or a plurality of software modules (e.g., software or software modules for providing a distributed service), or may be implemented as a single piece of software or a single software module, which will not be specifically defined here.

It should be appreciated that the numbers of the terminal devices, the networks and the servers in FIG. 1 are merely illustrative. Any number of terminal devices, networks and servers may be provided based on actual requirements.

Figure 2:
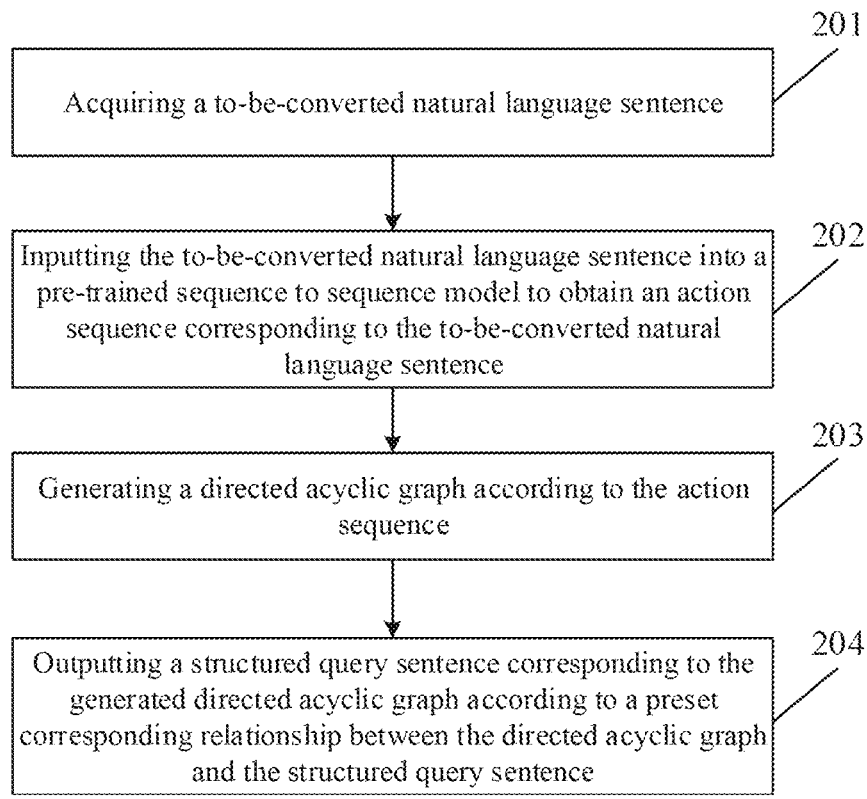
FIG. 2 is a flowchart of a method for outputting a structured query sentence according to an embodiment of the present disclosure.

Further referring to FIG. 2, FIG. 2 illustrates a flow 200 of a method for outputting a structured query sentence according to an embodiment of the present disclosure. The method for outputting a structured query sentence includes the following steps.

Step 201, acquiring a to-be-converted natural language sentence.

In this embodiment, an executing body (e.g., the server or the terminal shown in FIG. 1) of the method for outputting a structured query sentence may first acquire the to-be-converted natural language sentence. The to-be-converted natural language sentence may be derived from natural language information in a form of text, image or speech that is inputted by a user.

Step 202, inputting the to-be-converted natural language sentence into a pre-trained sequence to sequence model to obtain an action sequence corresponding to the to-be-converted natural language sentence.

In this embodiment, the above executing body may input the to-be-converted natural language sentence acquired in step 201 to the pre-trained sequence to sequence model to obtain the action sequence corresponding to the to-be-converted natural language sentence. The sequence to sequence model may be used to characterize the corresponding relationship between a natural language sentence and an action sequence. The sequence to sequence (Seq2Seq) may include an encoder-decoder model, or may include one or more neural network models that may use an RNN (recurrent neural network). Hidden nodes in the network structure of the recurrent neural network are connected to form a ring, which not only learns information at the current moment, but also relies on previous sequence information. The special network model structure of the RNN solves the problem of saving information. Therefore, the RNN has unique advantages in dealing with the problems of a time sequence and a language text sequence. Further, one or more of a variant LSTM (long short term memory network) and a GRU (gated recurrent unit) of the RNN may be used to constitute the sequence to sequence model.

In some alternative implementations of this embodiment, the sequence to sequence model includes a model trained by: acquiring a sample set, the sample set including a sample natural language sentence and a sample structured query sentence corresponding to the sample natural language sentence; ascertaining a sample directed acyclic graph corresponding to the sample structured query sentence in the sample set according to a preset corresponding relationship between a directed acyclic graph and a structured query sentence; acquiring a sample action sequence of the ascertained sample directed acyclic graph; and using respectively the sample natural language sentence and a sample action sequence corresponding to the sample natural language sentence as an input and an output to train and obtain the sequence to sequence model.

In some alternative implementations of this embodiment, a dual model of the sequence to sequence model may further be established, i.e., a model in which the input is an action sequence and the output is a natural language sentence, and then the two models are jointly trained based on a reinforcement learning method, to obtain the sequence to sequence model.

Step 203, generating a directed acyclic graph according to the action sequence.

In this embodiment, the above executing body may generate the directed acyclic graph according to the action sequence obtained in step 202. Here, the above executing body may convert the action sequence into the directed acyclic graph, using a graph-based parsing method, a transition-based parsing method, or a pre-trained model representing a corresponding relationship between an action sequence and a directed acyclic graph. The graph-based parsing method may use a dynamic programming-based decoding algorithm, and the transition-based parsing method may construct a directed acyclic graph through a series of transition actions such as shift and reduce.

Step 204, outputting a structured query sentence corresponding to the generated directed acyclic graph according to a preset corresponding relationship between a directed acyclic graph and a structured query sentence.

In this embodiment, the above executing body may output the structured query sentence corresponding to the directed acyclic graph generated in step 203, according to the preset corresponding relationship between the directed acyclic graph and the structured query sentence. The corresponding relationship between the directed acyclic graph and the structured query sentence may include a corresponding relationship between a semantic chunk in the directed acyclic graph and the structured query sentence, or a corresponding relationship between the overall directed acyclic graph and the structured query sentence. The above corresponding relationship may be obtained by enumeration.

In some alternative implementations of this embodiment, the outputting a structured query sentence corresponding to the generated directed acyclic graph according to a preset corresponding relationship between a directed acyclic graph and a structured query sentence includes: ascertaining a node in the directed acyclic graph as a first part of the structured query sentence, the first part including an aggregator, a field name, a table name and an attribute; and ascertaining a relationship between nodes in the directed acyclic graph as a second part of the structured query sentence.

An SQL query sentence is obtained by combining sub-query sentences according to a certain grammar. As an example, a sub-query sentence associated with an SQL query sentence "Sel_S" may include "SELECT (A_S)+ FROM table WHERE (W_S)?", a sub-query sentence associated with an SQL query sentence "A_S" may include "(AGG)? Column," a sub-query sentence associated with an SQL query sentence "W_S" may include "C_S (condition_relation C_S)*" and a sub-query sentence associated with an SQL query sentence "C_S" may include "Column OP value." Here, "*" may represent 0 or more times, "+" may represent 1 or more times, and "?" may represent 0 or 1 times. AGG may represent an aggregator in the SQL, and may include: min (minimum), max (maximum), count (total number), sum and avg (average). OP is the abbreviation of an operator in SQL, and may include: >(greater than), >=(greater than or equal to), <(less than), <=(less than or equal to), ==(equal to), !=(not equal to), etc. Column may represent a column name or a field name of a table, and value may represent an attribute, that is, a specific value. Here, conditon_relation may represent a relationship between SQL-defined conditions, including "and" and "or".

In some alternative implementations of this embodiment, the directed acyclic graph includes at least one combination of information items, and the combination of the information items includes parent node information, child node information and relationship information. In this embodiment, the directed acyclic graph is represented as a combination of several information items, which facilitates the mutual conversion between the directed acyclic graph and the action sequence, thus further improving the efficiency of outputting the structured query sentence. As an example, the format of the combination of the information items is (parent node information, child node information, relationship information), and the graph corresponding to the associated sub-query sentence "SELECT (A_S)+FROM table WHERE (W_S)?" may be "(root, parent of A_S, SELECT) (root, table, FROM) (root, parent of W_S, WHEER)." The graph corresponding to the associated sub-query sentence "(AGG)? column" may be "(AGG, column, ARGS)." The graph corresponding to the associated sub-query sentence "C_S (condition_relation C_S)*" may be "(parent of first C_S, parent of second C_S, condition_relation)." The graph corresponding to the associated sub-query sentence "Column OP value" may be "(column, value, OP)." Here, root may represent a virtual root node, and ARGS may represent an ownership relationship, which may be understood as "of." Since the overall syntax of the SQL query sentence may be enumerated, a complete corresponding relationship may be obtained.

Figure 3:
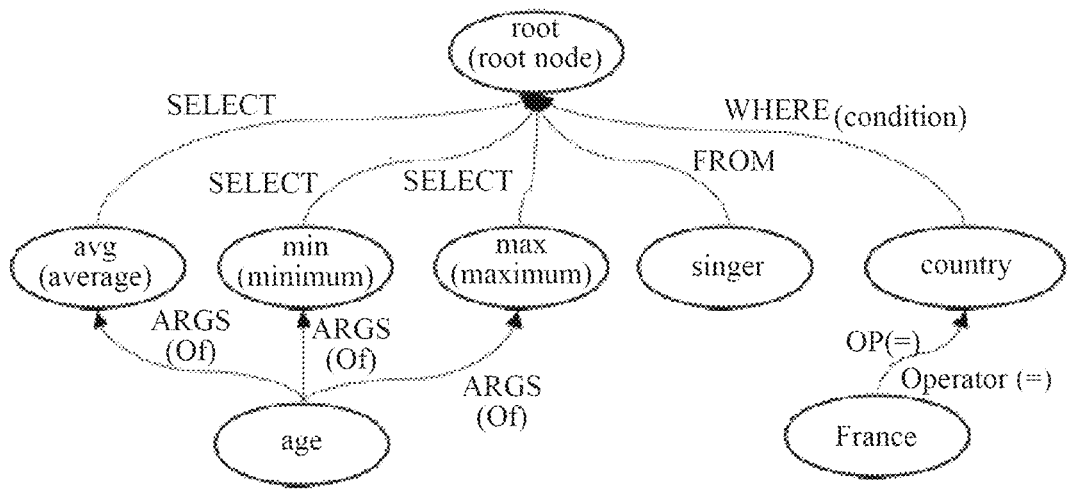
FIG. 3 is a schematic diagram of an application scenario of the method for outputting a structured query sentence according to an embodiment of the present disclosure.

Further referring to FIG. 3, FIG. 3 is a schematic diagram of an application scenario of the method for outputting a structured query sentence according to this embodiment. In the application scenario of FIG. 3, an acquired to-be-converted natural language sentence is "What is the average, minimum, and maximum age of all singers from France?", and then is inputted into a pre-trained sequence to sequence model to obtain a corresponding action sequence, and a directed acyclic graph is generated according to the action sequence, as shown in FIG. 3. Finally, according to a preset corresponding relationship between a directed acyclic graph and a structured query sentence, a structured query sentence corresponding to the generated directed acyclic graph is outputted as "SELECT avg(age), min(age), max(age) FROM singer WHERE country=France." Here, singer is a table name, age, country are fields in the table singer, and France is an attribute value of the field country.

According to the method provided in the above embodiment of the present disclosure, the to-be-converted natural language sentence is acquired. The to-be-converted natural language sentence is inputted into the pre-trained sequence to sequence model to obtain the action sequence corresponding to the to-be-converted natural language sentence. The directed acyclic graph is generated according to the action sequence. The structured query sentence corresponding to the generated directed acyclic graph is outputted according to the preset corresponding relationship between the directed acyclic graph and the structured query sentence. Thus, the accuracy of outputting the structured query sentence is improved.

Figure 4:
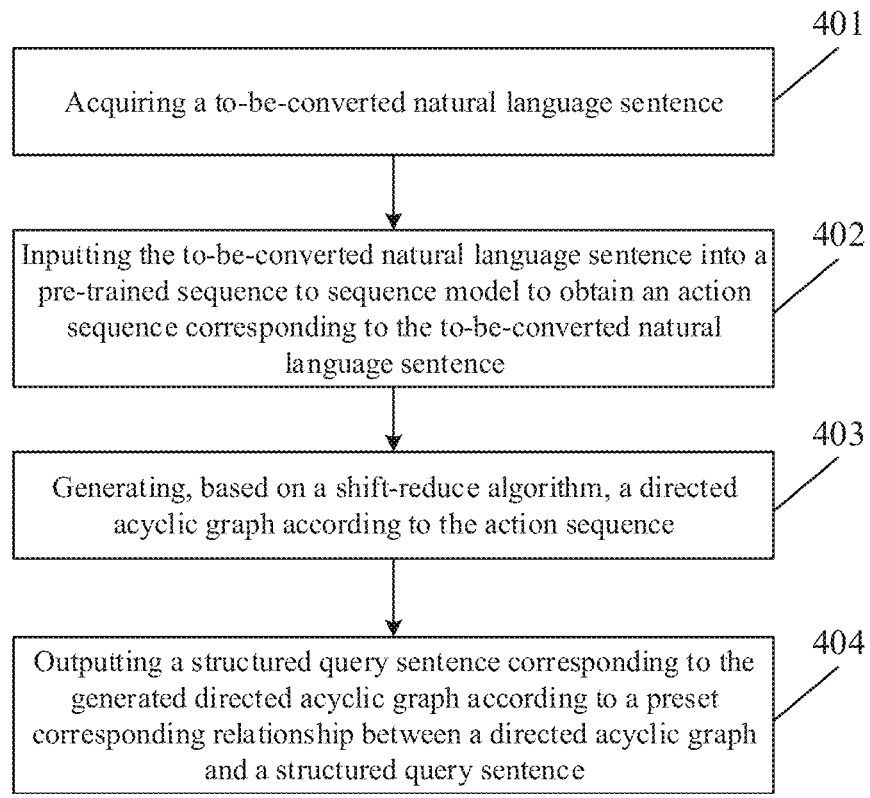
FIG. 4 is a flowchart of the method for outputting a structured query sentence according to another embodiment of the present disclosure.

Further referring to FIG. 4, FIG. 4 illustrates a flow 400 of another embodiment of a method for outputting a structured query sentence. The flow 400 of the method for outputting a structured query sentence includes the following steps.

Step 401, acquiring a to-be-converted natural language sentence.

In this embodiment, an executing body (e.g., the server or the terminal shown in FIG. 1) of the method for outputting a structured query sentence may first acquire the to-be-converted natural language sentence.

Step 402, inputting the to-be-converted natural language sentence into a pre-trained sequence to sequence model to obtain an action sequence corresponding to the to-be-converted natural language sentence.

In this embodiment, the above executing body may input the to-be-converted natural language sentence acquired in step 401 to the pre-trained sequence to sequence model to obtain the action sequence corresponding to the to-be-converted natural language sentence.

Step 403, generating, based on a shift-reduce algorithm, a directed acyclic graph according to the action sequence.

In this embodiment, the above executing body may generate the directed acyclic graph according to the action sequence obtained in step 402.

The shift-reduce algorithm may be completed by a configuration file and a set of actions. The configuration file is $C=(\delta,\eta,\beta,G_p)$. Here, $\delta$ represents a stack used to store a pair (index, node) that is derived from $\eta$ and will be processed again. Here, $\beta$ is used to store to-be-processed input information. $\eta$ is a fixed-size cache. $G_p$ is a constructed graph. The initial state of the configuration file is $([\ ], [\$_1, \ldots, \$_m], [n_1, \ldots, n_{|n|}], \emptyset)$. Here, "[ ]" and "$\emptyset$" represent that the stack $\delta$ and the graph $G_p$ are empty, $[\$1, \ldots, \$m]$ represents the cache, and $\beta$ is equal to the entire input, i.e., $[n1, \ldots, n|n|]$. When $\beta$ is empty, it represents that the processing is completed, and the graph $G_p$ represents the constructed graph.

The set of the actions may include PushNode($n_i$), which represents that the input $n_i$ is shifted from the input $\beta$ into the cache $\eta$, to be placed in the last position, and an element in $\eta$ is shifted into the stack. Pop represents that (i,v) is shifted from the stack $\delta$ into the $i^{th}$ position of the cache $\eta$. The elements after the $i^{th}$ position in the cache $\eta$ are moved to the right in turn, and the last element is removed from the cache. ArcGen(i,d,l) represents that the relationship between the leftmost element in the input $\beta$ and the $i^{th}$ element in the cache $\eta$ is determined, where the direction is d, and the arc relationship is l. If the relationships between the left-most element in the input $\beta$ and each elements in the cache $\eta$ are determined in turn, the arc relationship is determined to be None if there is no relationship.

The set of the actions may further include a shift, a left-reduce (arc_left_l), a right-reduce (arc_right_l), a root pop (pop_root), or the like, which may be specifically set according to actual needs.

As an example, Table 1 shows the process of generating, based on the shift-reduce algorithm, the directed acyclic graph according to the action sequence "max(maximum) age(age) singer(singers) france(France)" corresponding to the natural language sentence "what is the maximum age of all singers from France?".

TABLE 1

Process of generating directed acyclic graph

| stack | cache | buffer | actions | Graph |
|---|---|---|---|---|
| [ ] | [$, $, $, ROOT] | [maximum(max), age(age)] | | G = ( ) |
| [ ] | [$, $, $, ROOT] | [maximum(max/agg), age(age)] | ArcGen(3, r, SELECT) (2, —, None) (I, —, None) (0, —, None) | G += (0, 1, SELECT) |
| [(0, $)] | [$, $, ROOT, max] | [age(age), singers(singer)] | PushNode | G |

TABLE 1-continued

Process of generating directed acyclic graph

| stack | cache | buffer | actions | Graph |
|---|---|---|---|---|
| [(0, $)] | [$, $, ROOT, max] | [age(age/col), singers(singer)] | ArcGen(3, r, ARGS) (2, —. None) (I, —, None) (0, —, None) | G += (1, 2, ARGS) |
| [(0, $) (0, $)] | [$, ROOT, max, age] | [singers(singer), France(• • •)] | PushNode | G |
| [(0, $) (0, $)] | [$, ROOT, max, age] | [singers(singer/tab), France(• • •)] | ArcGen(3, —, None) (2, —. None) (0, r, From) (0, —, None) | G += (0, 3, FROM) |
| [(0, $) (0, $) (0, $)] | [ROOT, max, age, singer] | [France(country france)] | PushNode | G |
| [(0, $) (0, $) (0, $)] | [ROOT, max, age, singer] | [country(coutry/col)] | ArcGen(3, —, None) (2, —. None) (1, —, None) (0, r, WHERE) | G += (0, 4, WHERE) |
| [(0, $) • • • (1, max)] | [ROOT, age, singer, country] | [france(france)] | PushNode | G |
| [(0, $) • • • (1, max)] | [ROOT, age, singer, country] | [france(france/cell)] | ArcGen(3, r, OP(=)) (2, —, None) (I, —, None) (0, —, Node) | G += (4, 5, OP(=)) |
| [(0, $) • • • (1, age)] | [ROOT, singer, country, cell] | [ ] | PushNode | G |
| [ ] | [$, $, $, ROOT] | [ ] | Pop; Pop; Pop; Pop; Pop | G |

Step 404, outputting a structured query sentence corresponding to the generated directed acyclic graph according to a preset corresponding relationship between a directed acyclic graph and a structured query sentence.

In this embodiment, the above executing body may output the structured query sentence corresponding to the directed acyclic graph generated in step 403, according to the preset corresponding relationship between the directed acyclic graph and the structured query sentence.

In this embodiment, the operations of steps 401, 402 and 404 are substantially the same as those of steps 201, 202 and 204, which will not be repeatedly described here.

It may be seen from FIG. 4 that, as compared with the embodiment corresponding to FIG. 2, in the flow 400 of the method for outputting a structured query sentence in this embodiment, based on the shift-reduce algorithm, the directed acyclic graph is generated according to the action sequence. Therefore, the directed acyclic graph generated in the scheme described in this embodiment is more accurate, and thus, the accuracy of outputting the structured query sentence is further improved.

Figure 5:
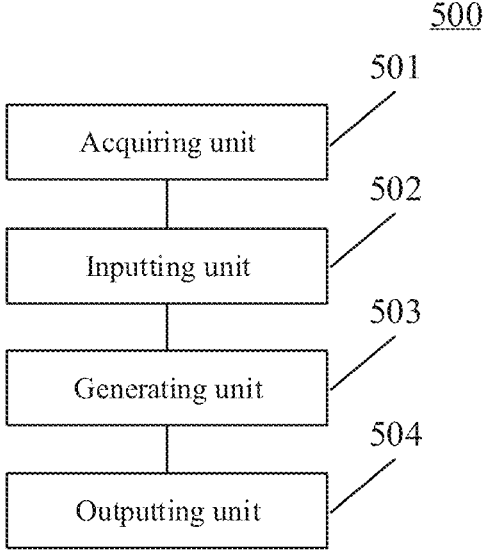
FIG. 5 is a schematic structural diagram of an apparatus for outputting a structured query sentence according to an embodiment of the present disclosure.

Further referring to FIG. 5, as an implementation of the method shown in the above drawings, an embodiment of the present disclosure provides an apparatus for outputting a structured query sentence. The embodiment of the apparatus corresponds to the embodiment of the method shown in FIG. 2, and the apparatus may be applied in various electronic devices.

As shown in FIG. 5, the apparatus 500 for outputting a structured query sentence in this embodiment includes an acquiring unit 501, an inputting unit 502, a generating unit 503 and an outputting unit 504. Here, the acquiring unit is configured to acquire a to-be-converted natural language sentence. The inputting unit is configured to input the to-be-converted natural language sentence into a pre-trained sequence to sequence model to obtain an action sequence corresponding to the to-be-converted natural language sentence. The generating unit is configured to generate a directed acyclic graph according to the action sequence. The outputting unit is configured to output a structured query sentence corresponding to the generated directed acyclic graph according to a preset corresponding relationship between a directed acyclic graph and a structured query sentence.

In this embodiment, for specific processes of the acquiring unit 501, the inputting unit 502, the generating unit 503 and the outputting unit 504 in the apparatus 500 for outputting a structured query sentence, reference may be made to step 201, step 202, step 203 and step 204 in the corresponding embodiment of FIG. 2.

In some alternative implementations of this embodiment, the apparatus further includes a training unit. The training unit includes: a first acquiring subunit, configured to acquire a sample set, the sample set including a sample natural language sentence and a sample structured query sentence corresponding to the sample natural language sentence; a first ascertaining subunit, configured to ascertain a sample directed acyclic graph corresponding to the sample structured query sentence in the sample set according to the preset corresponding relationship between the directed acyclic graph and the structured query sentence; a second acquiring subunit, configured to acquire a sample action sequence of the ascertained sample directed acyclic graph; and a training subunit, configured to use respectively the sample natural language sentence and a sample action sequence corresponding to the sample natural language sentence as an input and an output to train and obtain the sequence to sequence model.

In some alternative implementations of this embodiment, the generating unit is further configured to generate, based on a shift-reduce algorithm, the directed acyclic graph according to the action sequence.

In some alternative implementations of this embodiment, the directed acyclic graph includes at least one combination of information items, and the combination of the information items includes parent node information, child node information and relationship information.

In some alternative implementations of this embodiment, the outputting unit includes: a second ascertaining subunit, configured to ascertain a node in the directed acyclic graph as a first part of the structured query sentence, the first part including an aggregator, a field name, a table name and an attribute; and a third ascertaining subunit, configured to ascertain a relationship between nodes in the directed acyclic graph as a second part of the structured query sentence.

According to the apparatus provided in the above embodiment of the present disclosure, the to-be-converted natural language sentence is acquired. The to-be-converted natural language sentence is inputted into the pre-trained sequence to sequence model to obtain the action sequence corresponding to the to-be-converted natural language sentence. The directed acyclic graph is generated according to the action sequence. The structured query sentence corresponding to the generated directed acyclic graph is outputted according to the preset corresponding relationship between the directed acyclic graph and the structured query sentence. Thus, the accuracy of outputting the structured query sentence is improved.

Figure 6:
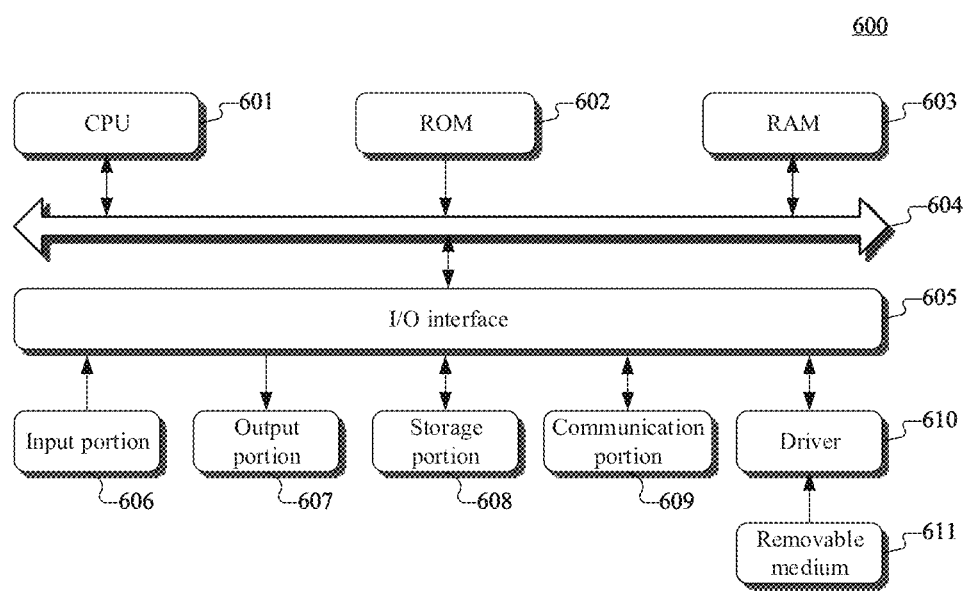
FIG. 6 is a schematic structural diagram of a computer system adapted to implement a server or a terminal according to some embodiments of the present disclosure.

Referring to FIG. 6, FIG. 6 is a schematic structural diagram of a server or a computer system 600 of a terminal adapted to implement embodiments of the present disclosure. The server or terminal shown in FIG. 6 is merely an example, and should not bring any limitations to the functions and the scope of use of the embodiments of the present disclosure.

As shown in FIG. 6, the computer system 600 may include a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including, for example, a keyboard, a mouse, or the like; an output portion 607 including, for example, a cathode ray tube (CRT), a liquid crystal display (LCD), a speaker or the like; a storage portion 608 including, for example, a hard disk or the like; and a communication portion 609 including a network interface card such as a LAN card, modem, or the like. The communication portion 609 performs communication processing via a network such as the Internet. The driver 610 is also connected to the I/O interface 605 as needed. A removable medium 611, such as a magnetic disk, an optical disk, a magneto-optical disk, a semiconductor memory, or the like, is installed on the drive 610 as needed, so that the computer program read out therefrom is installed into the storage portion 608 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication portion 609, and/or may be installed from the removable media 611. The computer program, when executed by the CPU 601, implements the functions as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor. For example, the processor may be described as: a processor including an acquiring unit, a generating unit, an inputting unit and an outputting unit. Here, the names of these units do not in some cases constitute a limitation to such units themselves. For example, the acquiring unit may alternatively be described as "a unit for acquiring a to-be-converted natural language sentence."

In another aspect, an embodiment of the present disclosure further provides a computer readable medium. The computer readable medium may be the computer readable medium included in the apparatus described in the above embodiments, or a stand-alone computer readable medium not assembled into the apparatus. The computer readable medium carries one or more programs. The one or more programs, when executed by the apparatus, cause the apparatus to: acquire a to-be-converted natural language sentence; input the to-be-converted natural language sentence into a pre-trained sequence to sequence model to obtain an action sequence corresponding to the to-be-converted natural language sentence; generate a directed acyclic graph according to the action sequence; and output a structured query sentence corresponding to the generated directed acyclic graph according to a preset corresponding relationship between the directed acyclic graph and the structured query sentence.

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for outputting a structured query sentence, comprising:
   acquiring a to-be-converted natural language sentence;
   inputting the to-be-converted natural language sentence into a pre-trained sequence to sequence model to obtain an action sequence corresponding to the to-be-converted natural language sentence;
   generating a directed acyclic graph according to the action sequence; and
   outputting a structured query sentence corresponding to the generated directed acyclic graph according to a preset corresponding relationship between a directed acyclic graph and a structured query sentence;
   wherein the sequence to sequence model includes a model trained and obtained by:
      acquiring a sample set, the sample set including a sample natural language sentence and a sample structured query sentence corresponding to the sample natural language sentence;
      ascertaining a sample directed acyclic graph corresponding to the sample structured query sentence in the sample set according to the preset corresponding relationship;
      acquiring a sample action sequence of the ascertained sample directed acyclic graph; and
      using respectively the sample natural language sentence and a sample action sequence corresponding to the sample natural language sentence as an input and an output to train and obtain the sequence to sequence model.

2. The method according to claim 1, wherein the generating a directed acyclic graph according to the action sequence comprises:
   generating, based on a shift-reduce algorithm, the directed acyclic graph according to the action sequence.

3. The method according to claim 1, wherein the directed acyclic graph includes at least one combination of information items, and the combination of the information items includes parent node information, child node information and relationship information.

4. The method according to claim 1, wherein the outputting a structured query sentence corresponding to the generated directed acyclic graph according to a preset corresponding relationship between a directed acyclic graph and a structured query sentence comprises:
   ascertaining a node in the directed acyclic graph as a first part of the structured query sentence, the first part including an aggregator, a field name, a table name and an attribute; and
   ascertaining a relationship between nodes in the directed acyclic graph as a second part of the structured query sentence.

5. An apparatus for outputting a structured query sentence, comprising:
   at least one processor; and
   a memory storing instructions, wherein the instructions when executed by the at least one processor, cause the at least one processor to perform operations, the operations comprising:
   acquiring a to-be-converted natural language sentence;
   inputting the to-be-converted natural language sentence into a pre-trained sequence to sequence model to obtain an action sequence corresponding to the to-be-converted natural language sentence;
   generating a directed acyclic graph according to the action sequence; and
   outputting a structured query sentence corresponding to the generated directed acyclic graph according to a preset corresponding relationship between a directed acyclic graph and a structured query sentence;
   wherein the sequence to sequence model includes a model trained and obtained by:
      acquiring a sample set, the sample set including a sample natural language sentence and a sample structured query sentence corresponding to the sample natural language sentence;
      ascertaining a sample directed acyclic graph corresponding to the sample structured query sentence in the sample set according to the preset corresponding relationship;
      acquiring a sample action sequence of the ascertained sample directed acyclic graph; and
      using respectively the sample natural language sentence and a sample action sequence corresponding to the sample natural language sentence as an input and an output to train and obtain the sequence to sequence model.

6. The apparatus according to claim 5, wherein the generating a directed acyclic graph according to the action sequence comprises:
   generating, based on a shift-reduce algorithm, the directed acyclic graph according to the action sequence.

7. The apparatus according to claim 5, wherein the directed acyclic graph includes at least one combination of information items, and the combination of the information items includes parent node information, child node information and relationship information.

8. The apparatus according to claim 5, wherein the outputting a structured query sentence corresponding to the generated directed acyclic graph according to a preset corresponding relationship between a directed acyclic graph and a structured query sentence comprises:
   ascertaining a node in the directed acyclic graph as a first part of the structured query sentence, the first part including an aggregator, a field name, a table name and an attribute; and
   ascertaining a relationship between nodes in the directed acyclic graph as a second part of the structured query sentence.

9. A non-transitory computer readable medium, storing a computer program, wherein the program, when executed by a processor, causes the processor to perform operations, the operations comprising:
   acquiring a to-be-converted natural language sentence;
   inputting the to-be-converted natural language sentence into a pre-trained sequence to sequence model to obtain an action sequence corresponding to the to-be-converted natural language sentence;
   generating a directed acyclic graph according to the action sequence; and
   outputting a structured query sentence corresponding to the generated directed acyclic graph according to a preset corresponding relationship between a directed acyclic graph and a structured query sentence;
   wherein the sequence to sequence model includes a model trained and obtained by:
      acquiring a sample set, the sample set including a sample natural language sentence and a sample structured query sentence corresponding to the sample natural language sentence;
      ascertaining a sample directed acyclic graph corresponding to the sample structured query sentence in the sample set according to the preset corresponding relationship;
      acquiring a sample action sequence of the ascertained sample directed acyclic graph; and
      using respectively the sample natural language sentence and a sample action sequence corresponding to the sample natural language sentence as an input and an output to train and obtain the sequence to sequence model.

10. The non-transitory computer readable medium according to claim 9, wherein the generating a directed acyclic graph according to the action sequence comprises:
    generating, based on a shift-reduce algorithm, the directed acyclic graph according to the action sequence.

11. The non-transitory computer readable medium according to claim 9, wherein the directed acyclic graph includes at least one combination of information items, and the combination of the information items includes parent node information, child node information and relationship information.

12. The non-transitory computer readable medium according to claim 9, wherein the outputting a structured query sentence corresponding to the generated directed acyclic graph according to a preset corresponding relationship between a directed acyclic graph and a structured query sentence comprises:
    ascertaining a node in the directed acyclic graph as a first part of the structured query sentence, the first part including an aggregator, a field name, a table name and an attribute; and
    ascertaining a relationship between nodes in the directed acyclic graph as a second part of the structured query sentence.

\* \* \* \* \*